No. 638,622. Patented Dec. 5, 1899.
B. F. & A. C. BROCKMEYER.
MAIL BOX.
(Application filed Aug. 18, 1899.)
(No Model.) 2 Sheets—Sheet 1.
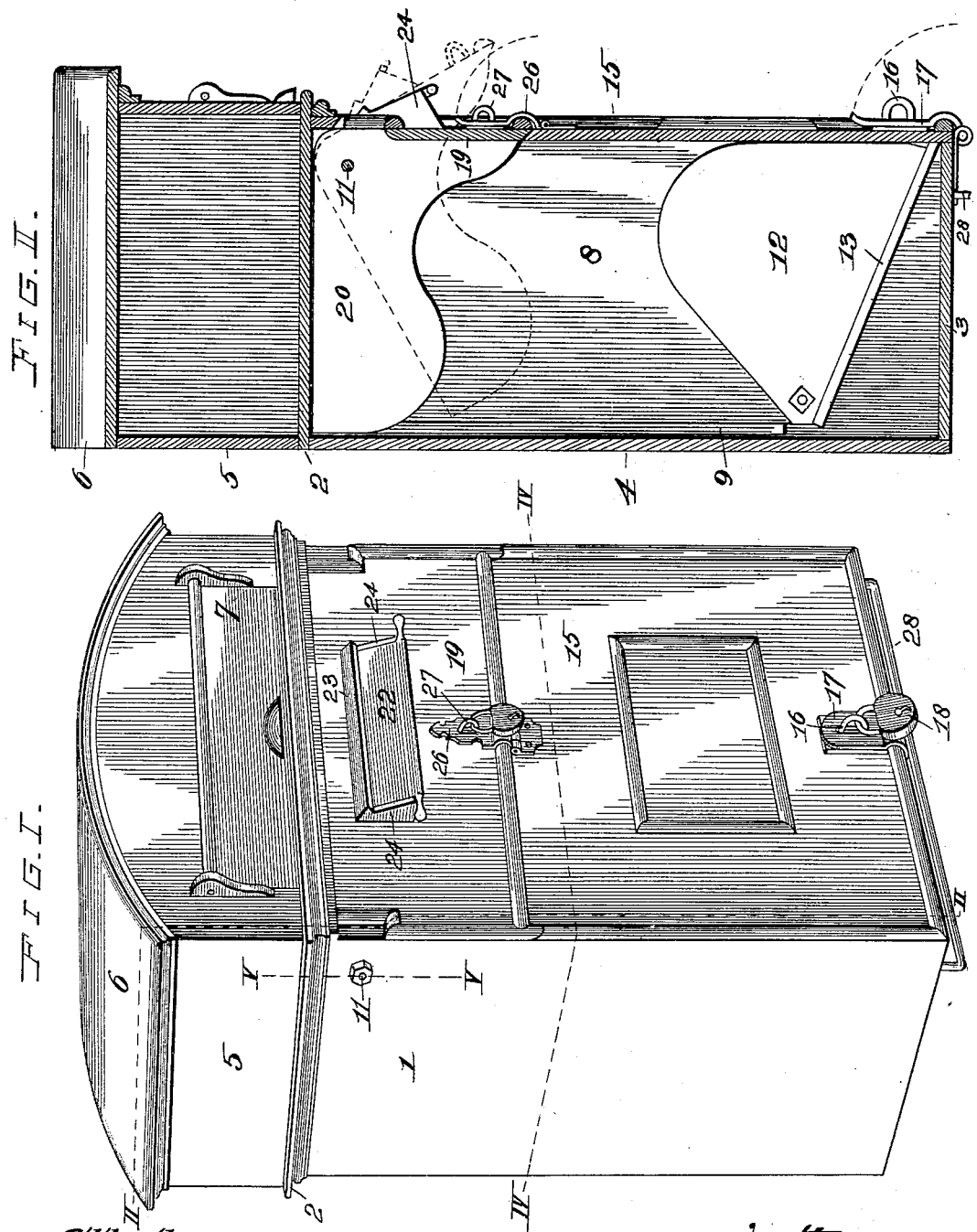
Inventors
Benj. F. Brockmeyer
and Albert C. Brockmeyer
By Wright Bro Atty's
Attest No. 638,622. Patented Dec. 5, 1899.
B. F. & A. C. BROCKMEYER.
MAIL BOX.
(Application filed Aug. 18, 1899.)
(No Model.) 2 Sheets—Sheet 2.
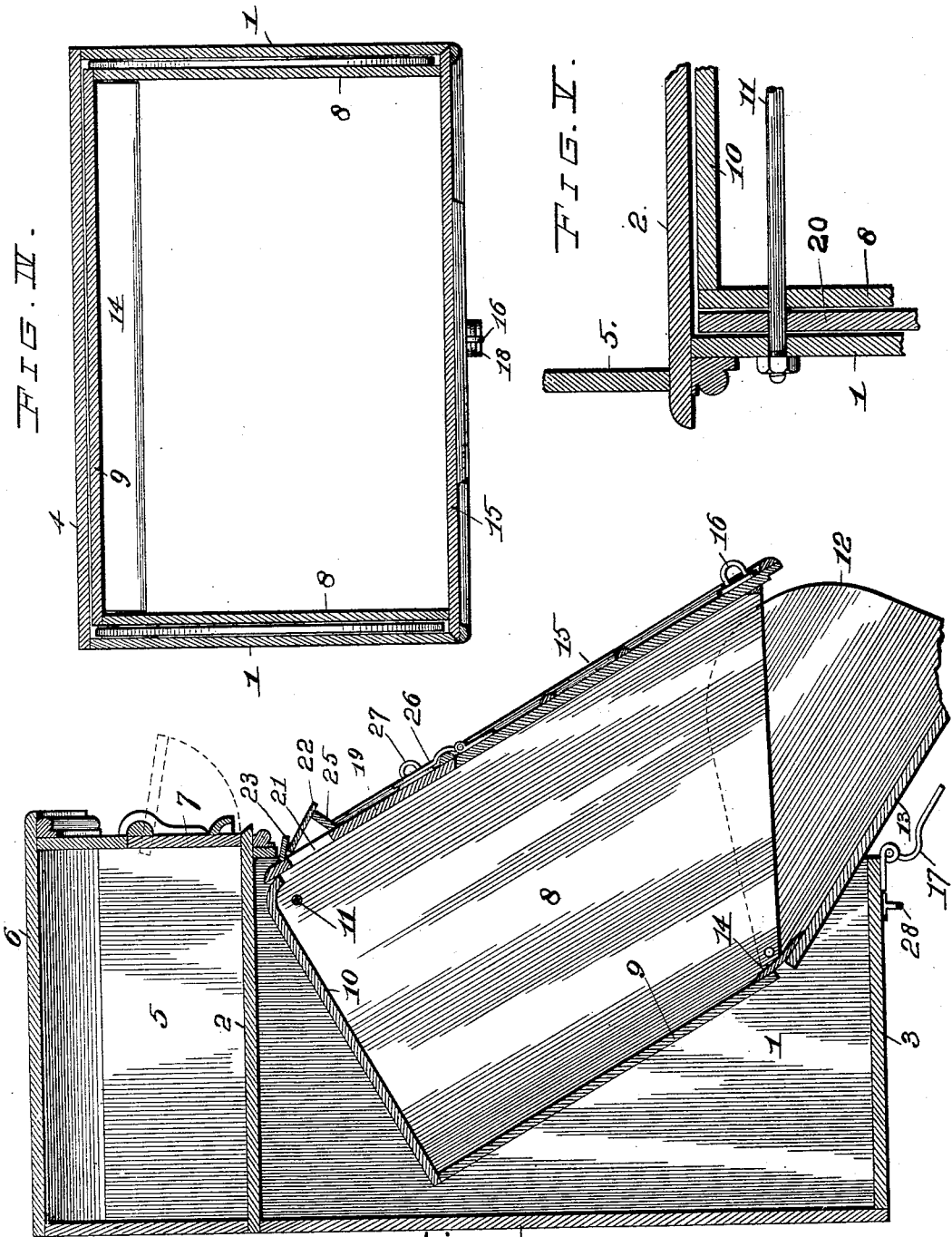
Inventors:
Benj. F. Brockmeyer
and Albert C. Brockmeyer
By Wright Bro Atty's

UNITED STATES PATENT OFFICE.

BENJAMINE F. BROCKMEYER AND ALBERT C. BROCKMEYER, OF ST. LOUIS, MISSOURI.

MAIL-BOX.

SPECIFICATION forming part of Letters Patent No. 638,622, dated December 5, 1899.

Application filed August 18, 1899. Serial No. 727,622. (No model.)

*To all whom it may concern:*

Be it known that we, BENJAMINE F. BROCKMEYER and ALBERT C. BROCKMEYER, citizens of the United States, residing at the city of St. Louis, in the State of Missouri, have invented certain new and useful Improvements in Mail-Boxes, of which the following is a full, clear, and exact description, reference being had to the accompanying drawings, forming part of this specification.

The object of our invention is to provide a simple, inexpensive, and convenient mail-box for public use, which box will be absolutely stormproof at all times, including the period during which its contents are discharged into the collection bag or box.

A further object of our invention is to construct a mail-box wherein the operations required in delivering mail-matter into said box and discharging it therefrom are greatly facilitated.

Our invention consists in features of novelty hereinafter fully described, and pointed out in the claims.

Figure I is a perspective view of our improved mail-box. Fig. II is a vertical sectional view taken approximately on the line II II, Fig. I. Fig. III is a vertical sectional view through the center of the box and showing the inner dump-box in position assumed while discharging its contents. Fig. IV is a horizontal sectional view taken approximately on the line IV IV, Fig. I. Fig. V is an enlarged vertical sectional view taken approximately on the line V V, Fig. I.

Our improved box properly consists of an outer housing and a dump-box within the housing, the outer housing being rectangular in form and comprising the fixed sides 1 1, the top 2, bottom 3, and rear wall 4. Located on top of the housing is a receptacle 5, provided with a suitable top 6, in the front wall of which receptacle 5 is arranged a gravity-door 7. This receptacle 5 is designed to be used as a repository for papers, packages, and large pieces of mail-matter.

The inner dump-box comprises a pair of side walls 8, the lower ends of which are formed at an angle, (see Fig. III,) together with the rear wall 9 and top 10. The box so constructed is arranged to swing in the outer housing, there being a hinged rod 11 passed through the upper forward corners of the side walls 1 of the housing and the side walls 8 of the dump-box. The inner dump-box is of such width that when it is positioned within the outer housing slight spaces are formed between the adjacent side walls of the housing and inclosed box, and occupying the lower portions of the spaces thus formed is a dump-chute having side walls 12, pivotally held at their rear ends to the rear lower corners of the side walls 8 of the dump-box and having a bottom 13, adapted to serve also as a bottom for the dump-box when in closed position, and as the side walls of said box are, as previously stated, formed on an angle the bottom of the dump-chute necessarily lies at an incline, as seen in Fig. III. A strip 14 is fixed to the inner face of the lower end of the rear wall 9 of the dump-box, said strip serving to close the interstices between the lower edge of said rear wall and the rear end of the inclined chute-bottom 13.

A sectional plate, which will now be described, serves as a front wall or door for both the outer housing and the inclosed dump-box. The main portion of said plate comprises a rectangular section 15, to the inside faces of the side edges of which are fixed the forward edges of the side walls 8 of the dump-box, the said section entirely closing the lower portion of said box at the front. The side edges of said section 15 extend beyond the side walls 8 of the dump-box and are adapted to lie against the forward edges of the side walls 1 of the outer housing when the mail-box is closed. The lower edge of this section 15 extends downwardly far enough to engage directly against the front edge of the bottom 3 of the outer housing when the inner box is swung inwardly to its normal position, and fixed to and extending outwardly from the center of the lower portion of said section 15 is a staple 16, over which a hasp 17, hinged to the bottom 3, is adapted to pass. A padlock 18 or other suitable locking device is inserted through the staple 16 after the hasp is located thereon in order to securely lock the dump-box within the outer housing.

A rectangular plate 19, that closes the upper portion of the housing and dump-box, is provided with a pair of rearwardly-projecting wings 20, which extend into the spaces between the side walls 1 and 8 of the housing and dump-box, and said wings 20 are hinged at their forward upper corners upon the rod 11, previously mentioned. The rear ends of these wings 20 are widened or weighted in any suitable manner in order that they, together with the plate 19, may swing downwardly into the position shown by dotted lines, Fig. II, when the plate 19 is released from the plate 15.

Formed through the upper portion of the plate 19 is a horizontally-arranged slit 21, that is normally covered by a gravity-door 22, hinged beneath a hood 23, secured to the front face of the plate 19 immediately above said slit, and said gravity-door normally rests upon side projections 24 and a connecting projection 25, that serve as a chute for letters deposited through the slit 21. The lower edge of the plate 19 is beveled inwardly and upwardly to fit a corresponding bevel upon the top edge of the plate 15 for the purpose of providing a tight joint between these parts, and hinged to the center of the upper edge of said plate 15 is a hasp 26, that engages a staple 27, carried by the plate 19, and by means of a padlock or other suitable locking device the plate 19 may be secured to the plate 15.

A transversely-positioned rod 28, having upturned ends, is fixed to the under side of the housing-bottom 3. This rod is designed to serve as a socket for the reception of a portion of a frame of a mail-collecting sack, which is made the subject-matter of a separate application for patent.

When our improved mail-box is in use, the plate 19 is locked to the plate 15 and the plate 15 is in turn locked to the outer housing. Should a person desire to mail a paper or package, the gravity-door 7 is raised and the article is deposited within the receptacle 5. Should it be desired to mail a letter, the gravity-door 22 is raised and the letter is deposited through the slit 21.

While boxes of the present construction are in use, it has been the practice for carriers or others who collect mail-matter from the boxes in large buildings to deposit their collections in the street-boxes, to be in turn collected by the wagon-collectors. Where this form of collection is carried out, much time is lost in delivering the mail-matter collected into the street-boxes, for the reason that but few letters can be passed through the letter-box door at a time, and to obviate this loss of time we have arranged the swinging plate 19, which when unlocked swings outwardly, as indicated by dotted lines in Fig. II, thus forming a wide opening, through which a large number of letters may be passed at a time and the box again closed.

When it is desired to discharge all of the contents of the box into the bag or box of the wagon-collector or other person whose duty it is to collect the mail-matter from the street-boxes, the padlock 18 or other locking device is detached from the staple 16, and after the hasp 17 has been swung downwardly away from the lower edge of the plate 15 the inner dump-box will, by gravity and by reason of the weight of the accumulation of mail-matter, which is greatest at the front of the box, swing upon the rod 11, moving outwardly into the position seen in Fig. III. In so doing the chute 12 13 will swing downwardly, thereby opening the bottom of the dump-box, and all of the mail-matter contained by such box is instantly discharged into the receptacle held to receive it. This discharge of the mail-matter is accomplished in a very few seconds and is a very important feature where quick collections are desired, and as the mail is dropped downwardly from the bottom of the box into the receiving-receptacle it is not exposed to the liability of becoming wet where collections are being made during inclement weather.

Our improved mail-box is simple in construction and operation, and the parts are so arranged and connected together that the liability of their becoming out of order is reduced to a minimum.

We claim as our invention—

1. In a device of the class described, the combination of a housing, a swinging dump-box in said housing, and a movable chute or door mounted in the lower end of the housing adapted to move outwardly on the outward movement of said dump-box, substantially as described.

2. In a device of the class described, the combination of a housing, a swinging dump-box mounted in said housing, and a chute or door hinged to said dump-box, substantially as described.

3. In a device of the class described, the combination of a housing, a dump-box provided with walls forming the mail-receptacle movably mounted in said housing to assume a dumping position and a door movably connected to said dump-box, substantially as specified.

4. In a device of the class described, a housing, a dump-box hinged within said housing, and a chute hinged to the rear portion of the lower end of said dump-box, substantially as specified.

5. In a device of the class described, a housing, a dump-box hinged therein, a front plate normally closing the front of the housing and the box, a hinged door mounted in said plate, and weighted wings extending rearwardly from the ends of said hinged door, substantially as specified.

6. In a device of the class described, a housing, a dump-box hinged therein, a plate normally closing the front of the housing and box, a hinged door mounted in said plate, weighted wings extending rearwardly from the ends of said hinged door, and a chute hinged to the rear lower ends of the dump-box, substantially as specified.

7. In a mail-box, the combination with an open-front housing, of a dump-box hinged in said housing so that its lower end will swing outwardly therefrom, and a chute hinged at its rear end to the lower rear end of the dump-box, substantially as specified.

8. In a mail-box, the combination with an open-front housing, of a dump-box hinged in said housing so that its lower end will swing outwardly therefrom, a plate fixed to the lower front edges of the sides of the dump-box, a door-plate hinged to the front upper corners of the dump-box, and a chute hinged at its rear end to the lower rear end of the dump-box, substantially as specified.

9. In a mail-box, the combination with an open-front housing, of a dump-box hinged in said housing, a plate fixed to the lower front edges of the sides of the dump-box, a plate hinged in the upper portion of the front of the dump-box, weighted wings extending rearwardly from the sides of the hinged plate, and a chute hinged at its rear end to the lower rear end of the dump-box, substantially as specified.

BENJAMINE F. BROCKMEYER.
ALBERT C. BROCKMEYER.

In presence of—
E. S. KNIGHT,
N. V. ALEXANDER.